United States Patent
Wang et al.

(10) Patent No.: US 10,404,612 B2
(45) Date of Patent: Sep. 3, 2019

(54) PRIORITIZING FLOWS IN SOFTWARE DEFINED NETWORKS

(71) Applicant: Nicira, Inc., Palo Alto, CA (US)

(72) Inventors: Yong Wang, Sunnyvale, CA (US); Ronghua Zhang, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 98 days.

(21) Appl. No.: 15/655,371

(22) Filed: Jul. 20, 2017

(65) Prior Publication Data

US 2018/0159790 A1 Jun. 7, 2018

Related U.S. Application Data

(60) Provisional application No. 62/428,785, filed on Dec. 1, 2016.

(51) Int. Cl.
| | |
|---|---|
| *H04L 12/26* | (2006.01) |
| *H04L 12/863* | (2013.01) |
| *H04L 12/717* | (2013.01) |
| *H04L 12/721* | (2013.01) |
| *H04L 12/813* | (2013.01) |
| *H04L 12/861* | (2013.01) |
| *H04L 12/725* | (2013.01) |
| *H04L 12/751* | (2013.01) |

(52) U.S. Cl.
CPC .......... *H04L 47/6215* (2013.01); *H04L 45/26* (2013.01); *H04L 45/42* (2013.01); *H04L 45/02* (2013.01); *H04L 45/302* (2013.01); *H04L 45/38* (2013.01); *H04L 47/20* (2013.01); *H04L 49/90* (2013.01)

(58) Field of Classification Search
CPC ..... H04L 43/10; H04L 45/38; H04L 43/0811; H04L 45/026; H04L 43/0829; H04L 45/28; H04L 47/2441; H04L 12/4641; H04L 41/0654
See application file for complete search history.

(56) References Cited

U.S. PATENT DOCUMENTS

| | | | | |
|---|---|---|---|---|
| 2011/0199911 | A1* | 8/2011 | Ikada | H04L 41/0681 370/242 |
| 2016/0330111 | A1* | 11/2016 | Manghirmalani | H04L 43/028 |
| 2017/0041209 | A1* | 2/2017 | Joshi | H04L 45/64 |
| 2017/0195209 | A1* | 7/2017 | Singh | H04L 43/10 |
| 2017/0364794 | A1* | 12/2017 | Mahkonen | G06N 3/08 |
| 2018/0183654 | A1* | 6/2018 | Patel | H04L 41/0654 |

* cited by examiner

*Primary Examiner* — Sai Aung

(57) ABSTRACT

Described herein are systems, methods, and software to enhance network traffic management. In one implementation, a method of operating a network interface system on a host computing system includes receiving a plurality of network packets and, for each packet in the plurality of network packets, identifying whether the packet comprises a control packet for fault detection in a software defined network (SDN). The method further includes prioritizing, for processing by a main processing system of the computing system, each packet in the plurality of network packets based on whether the packet comprises a control packet for fault detection in a SDN.

17 Claims, 9 Drawing Sheets

PRIORITIZING FLOWS IN SOFTWARE DEFINED NETWORKS

RELATED APPLICATIONS

This application hereby claims the benefit of and priority to U.S. Provisional Patent Application No. 62/428,785, titled "PRIORITIZING FLOWS IN SOFTWARE DEFINED NETWORKS," filed Dec. 1, 2016, and which is hereby incorporated by reference in its entirety.

BACKGROUND

In computing environments, software defined networks may be used that comprise software modules capable of providing a communication platform for one or more virtual nodes in the computing environment. The software defined networks, which may include virtual switches, routers, distributed firewalls, and the like, may be used to intelligently direct communication on the network by inspecting packets before passing them to other nodes on the same network. To provide the required operations, software defined networks may be separated into a data plane, which is used to manage communications for active nodes (virtual machines and containers) in the computing environment, and a control plane, which is used to configure the various virtual switches, routers, distributed firewalls, and the like, as well as identify the operational status of elements within the computing environment.

In some implementations SDNs use control packets, such as Bidirectional Forwarding Detection (BFD) packets, Border Gateway Protocol (BGP) packets, and other similar control packets, which have the requirement of reliable and timely delivery. If, for any reason not related to network failure, the control packets are not delivered within a certain time period, unnecessary actions (such as fail over to a standby node or tear down of a BGP session) will be taken based on the assumption that a network failure has occurred. Using BFD as an example, control packets could be exchanged between transport nodes (hypervisors or gateway nodes, such as Virtual Extensible Local Area Network (VXLAN) tunnel endpoints (VTEPs)), between gateway nodes in a gateway cluster, or between a gateway and a remote router. In a SDN, when control packets are communicated over virtual network interfaces and/or physical network interfaces, the control packets will be mixed with other data packets which are less sensitive to packet drops or delays. Under high load, those control packets can be dropped or significantly delayed by the network interface, which may cause various unnecessary disruptions to the network functions.

Overview

The technology disclosed herein enhances network traffic management for software defined networks. In one implementation, a method of operating a host computing system includes receiving a plurality of network packets and, for each packet in the plurality of network packets, identifying whether the packet comprises a control packet for fault detection in a software defined network (SDN). The method further includes prioritizing, for processing by a main processing system of the computing system, each packet in the plurality of network packets based on whether the packet comprises a control packet for fault detection in a SDN.

DETAILED DESCRIPTION

Figure 1:
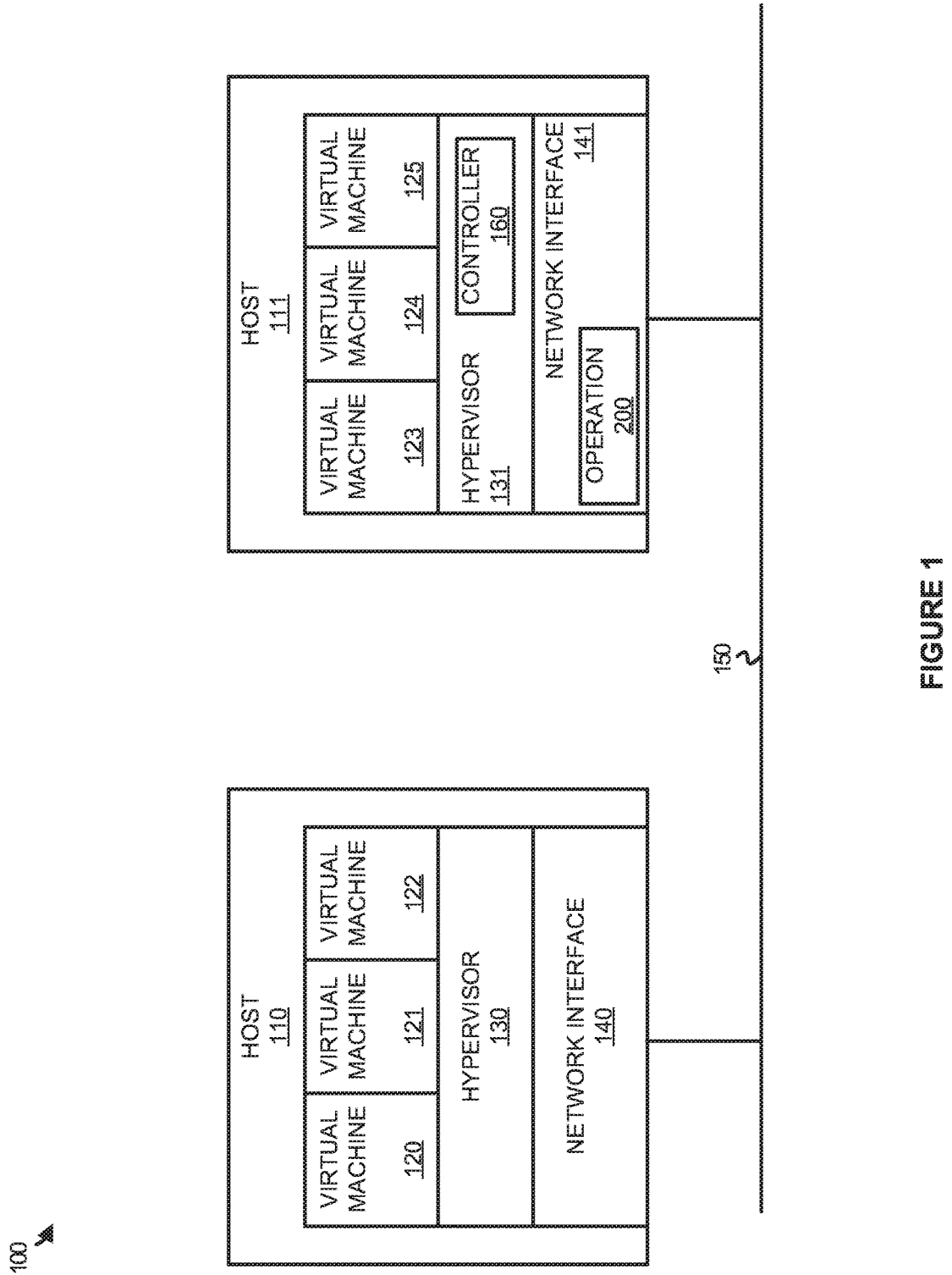
FIG. 1 illustrates a computing environment to prioritize processing of control packets for fault detection in software defined networks (SDNs) according to an implementation.

The various examples disclosed herein provide enhancements for managing control packets as they are received at physical interfaces in a computing environment. In many virtualized computing environments, a plurality of host computing systems may be deployed that provide a platform for virtualized computing nodes, such as virtual machines and containers. To manage the communications between the virtualized computing nodes as well as computing systems outside of the virtual computing environment, software defined networks (SDNs) may be employed that are used to intelligently direct communications by the virtual computing nodes by inspecting packets before forwarding the packets over the network. The operations provided by the SDNs may include virtual switches, routers, distributed firewalls, and the like.

To provide the configurations of the SDNs, a control plane is provided that is used in configuring and maintaining the different virtual networking elements of the computing environment. For example, the control plane may be used to provide configurations of a distributed firewall that is deployed for the virtual computing nodes of the environment to limit the communications of the computing nodes. Additionally, the control plane may be used to verify the operational status of the various virtual networking elements in the computing environment. For example, Bidirectional Forwarding Detection (BFD) packets may be exchanged between virtual switches deployed on multiple hosts to verify the operational status of the virtual switches. If a virtual switch fails to provide a BFD packet within a particular period of time, a failover event may occur, which is used to maintain the operations of the network. This may include moving the operations of the virtual switch to another host computing system, migrating virtual machines, or some other similar failover operation. Although this is one example, in some implementations, in addition to providing the operational status between virtual switches, the BFD packets may further be exchanged between, and used to verify the operational status of, Virtual Extensible Local Area Network (VXLAN) tunnel endpoints (VTEPs) for edge computing nodes, and VTEPs for one or more hypervisors.

Here, to limit delay in the communication of control packets for fault detection, such as BFD and Border Gateway Protocol (BGP) packets, the network interface of the host computing systems may be used to prioritize the packets as they are communicated. In particular, as the packets are received, the network interface may provide packet inspection, using filters and/or offsets, to determine the type of packet that was received, either a data or control packet. Once a determination is made, the packet may be prioritized based on whether the packet is a control packet. In some implementations, the prioritization may include placing the packet in a corresponding control queue allocated processing resources for managing the control packets. In particular, the control queue, or control processing queue, may be allocated one or more cores, a portion of clock cycles, memory, or some other similar processing resource. These resources for the control queue may be proportioned such that the control packets receive a higher quality of service than other data packets received over the physical network interface. Thus, when a large number of packets are received at a host computing system at any one time, the network interface may be configured to prioritize and provide a higher quality of service to the packets classified as control packets.

FIG. 1 illustrates a computing environment 100 to prioritize processing of control packets for fault detection in software defined networks (SDNs) according to an implementation. Computing environment 100 includes hosts 110-111 with virtual machines 120-125, hypervisors 130-131, and network interfaces 140-141. Host 111 further includes controller 160 used to configure the filtering operations of network interface 141, and network interface 141 further includes operation 200 that is further described in FIG. 2. Host 110 communicates with host 111 via communication link 150. Hypervisors 130-131 may comprise hosted hypervisors that execute on top of an operating system or may comprise bare metal hypervisors that execute without the requirement of an operating system to provide a virtualization layer to the virtual machines. Although demonstrated in the example computing environment 100 as a host with virtual machines executing via a hypervisor, it should be understood that similar operations may be provided by an edge host that provides network connectivity as a distributed router or centralized gateway for services of a software defined network (such as firewall services, virtual private network (VPN) services, and the like), wherein the edge host may be connected to the internet, other edge hosts, as well as hosts for virtual machines and containers. In particular, rather than a hypervisor and virtual machines, the edge host may comprise at least one virtual switch and a VTEP to communicate with the other computing systems.

In operation, hosts 110-111 execute hypervisors 130-131, respectively, to provide a platform for virtual machines 120-125. Hypervisors 130-131 abstract the physical components of hosts 110-111 and provide virtual representations of hardware to the virtual machines, including processing systems, storage interfaces, network interfaces, or some other abstracted components. In addition to providing the abstracted hardware for the operations of virtual machines 120-125, hypervisors 130-131 may be used to provide SDNs to the virtual machines. These SDNs are used to provide connectivity between virtual machines and computing nodes that may exist on the same host computing system, or may operate on separate computing systems.

To provide the SDNs, control packets, such as BFD packets, BGP packets, or some other control packets, are exchanged between physical host computing systems to provide various operations. The operations may include configuring virtual switches and routers on the host computing systems, providing health monitoring between hypervisors and physical machines, or providing any other similar control operation. Because the control operations often require a timely exchange of communications, when a communication is not received within a defined time period, failover mechanisms may be employed to compensate for the delay in the communication. For example, if a first host fails to receive a control message from a second host within a defined time period, the first host may identify a failure of the second host and initiate failover operations to a third host.

Here, to better identify control messages and manage congestion at physical network interfaces 140-141, processes are included to prioritize fault detection control packets over other data packets received at a network interface. This ensures that the fault detection control packets are not delayed in communication due to congestion of other data packets being communicated between hosts or other physical computing systems.

Figure 2:
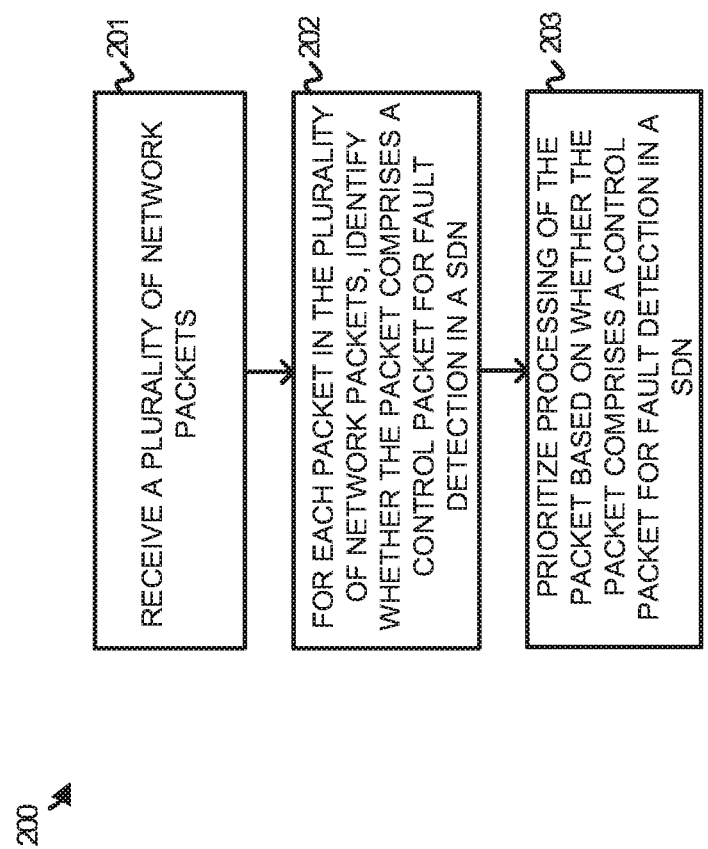
FIG. 2 illustrates an operation of a host computing system to prioritize processing of control packets for fault detection in SDNs according to an implementation.

FIG. 2 illustrates an operation 200 of a host computing system to prioritize processing of control packets for fault detection in SDNs according to an implementation. The processes of FIG. 2 are referenced parenthetically in the paragraphs that follow with reference to systems and elements from computing environment 100 of FIG. 1. Although described with reference to host 111, it should be understood that similar operations may be provided by network interface 140 of host 110.

As depicted, operation 200 includes receiving (201) a plurality of network packets at physical network interface 141. These packets may be transferred from host 110 or may be transferred from some other computing system communicatively coupled to host 111. In response to receiving the packets at network interface 141, operation 200 further includes, for each packet in the plurality of network packets, identifying (202) whether the packet comprises a control packet for fault detection in a SDN. To make this determination, network interface 141 may be used to inspect the received packets for attributes related to a control packet. In some examples, the control packets may include an identifier within the header of the packet, which indicates that the packet is a control packet, such as a BFD or BGP packet. In other implementations, the packets may be inspected for source and destination internet protocol (IP) addresses, source and destination ports, and the like that correspond to fault detection control packets. Once a packet is inspected, operation 200 prioritizes (203) processing of the packet based on whether the packet comprises a control packet for the SDN. This prioritization may be used by host 111 to promote the processing of the control packets before other data packets with less restrictive time constraints. Consequently, when network interface 141 is congested, rather than causing delays in the processing of control packets, the control packets may be prioritized to prevent unnecessary disruptions or failover actions caused by delays in processing the packets.

In some implementations, the prioritization of the control packets, may include separating the control packets from other packets received by the host, and placing the packets within a separate processing queue. For example, host 111, when a packet is received, may determine whether the packet comprises a control packet, and based on the determination, place the packet in either a control packet queue or a data packet queue. These queues may be allocated processing resources, such as processing cores, clock cycles, memory, or any other similar resources, such that the control packets may be processed in a different manner than other data packets received by the host system.

In some implementations, such as that illustrated in host 111 of FIG. 1, a controller 160 may be used to program network interface 141 to operate as described herein. Controller 160 may be implemented as part of the software of host 111, such as the example in FIG. 1, may be implemented as part of another computing element in computing environment 100, or as part of a distributed controller for computing environment 100 over multiple computing systems, wherein controller 160 may configure the network interface based on a network topology of the computing environment. In particular, the controller 160 may be used to identify computing elements (hypervisors, VTEPs, and the like) that exchange fault detection control packets. Once the elements are identified, source and destination addressing information for the elements, such as source internet protocol (IP) addresses, destination IP addresses, source ports, and destination ports may be used to configure the network interface to identify the fault detection control packets. Once configured, network interface 141 may inspect the packets for the required attributes and classify the packets into queues based on whether the packets include the required attributes.

Although illustrated in the example of FIG. 2 as receiving a packet at the network interface, it should be understood that similar operations may be applied when transferring a packet from a physical network interface. For example, if host 111 were to transfer a control packet to host 110, the packet may be prioritized over other outgoing data packets, such that the control packet is transferred before the other data packets. This prioritization may ensure that a control packet is not improperly delayed at the network interface of host 111.

Further, while demonstrated in the example of FIGS. 1 and 2 using a hypervisor that provides virtual switching operations for virtual machines, it should be understood that similar operations may be applied to a virtual switch operation that is used for containers executing on a host computing system. Containers, unlike full operating system virtual machines, may share kernel resources of the host operating system, such as the kernel for host 111. Each container may further be provisioned to have its own identifier space, file system structure, and virtual network interface coupled to the virtual switch. This allows multiple containers to operate on the same host at any one time, while the containers may be treated as individual computing nodes.

Figure 3:
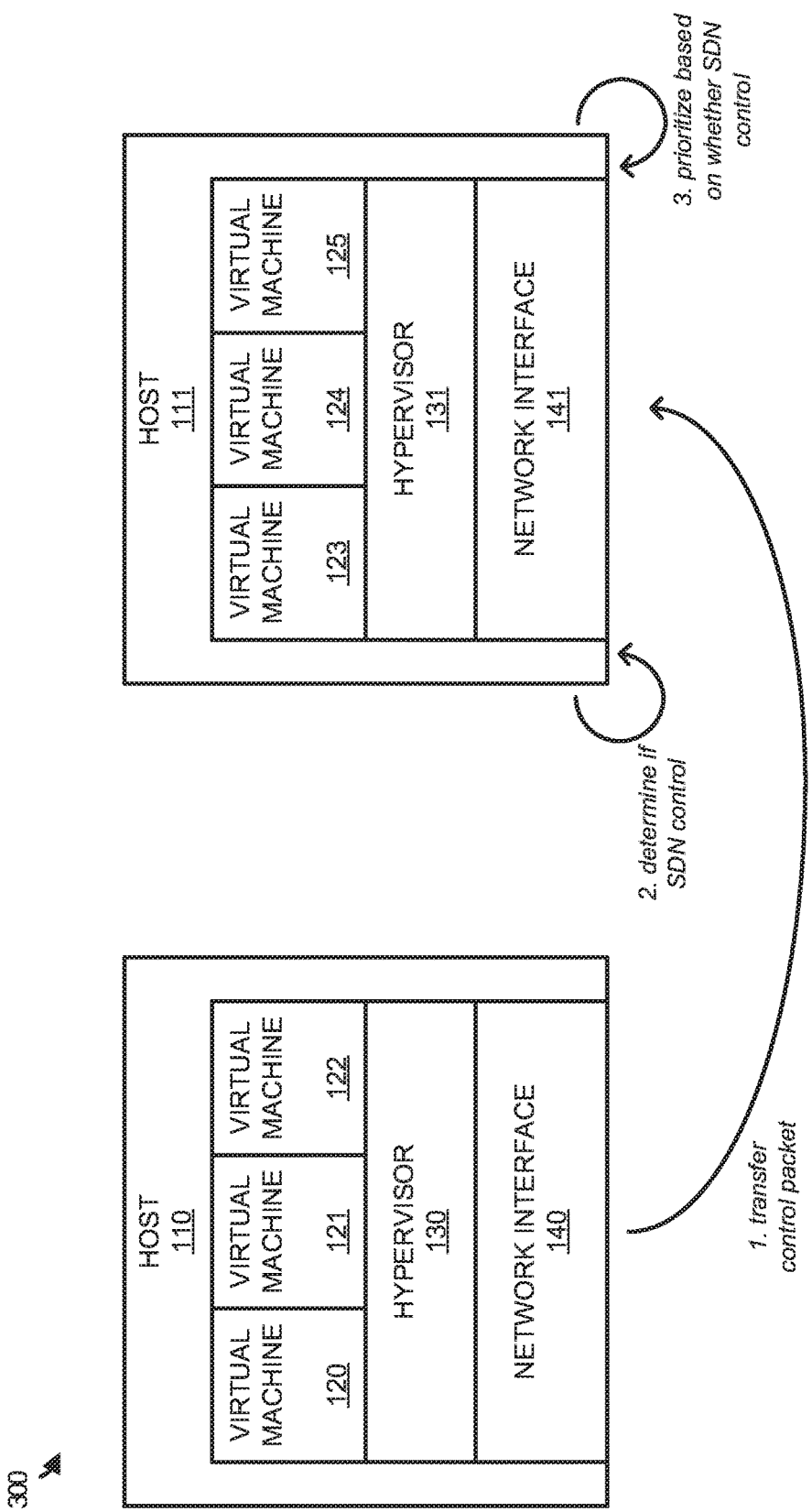
FIG. 3 illustrates an operational scenario of prioritizing a network packet according to an implementation.

FIG. 3 illustrates an operational scenario 300 of prioritizing a network packet according to an implementation. Operational scenario 300 includes systems and elements of computing environment 100 of FIG. 1. Although illustrated as transferring a packet from host 110 to host 111, it should be understood that similar operations may be provided for control packets transferred from host 111 to host 110.

As described herein, SDNs, which operate on host computing systems, often require the communication of control packets to provide configuration operations, health check operations, and other similar operations for virtual switches and routers of the network. Here, host 110 transfers, at step 1, a control packet via network interface 140 to host 111 and network interface 141. When the control packet is received by host 111, host 111 may process the packet to determine, at step 2, if the packet comprises a fault detection control packet. This determination may be made based on the header of the packet in some implementations, wherein network interface 141 may identify attributes (values) within the packet header to determine whether the packet is a control packet. For example, the network interface may inspect the header to determine whether a BGP identifier is located in the header of the packet. Once the determination is made, host 111 may prioritize, at step 3, the packet based on whether the packet is a fault detection control packet.

In some implementations, in prioritizing the packet, host 111 may prioritize processing resources of the host for control packets. Accordingly, when network interface 141 is receiving a large amount of data, packets that represent fault detection control packets may be prioritized for processing to ensure that configuration and health monitoring actions are taken ahead of other packets in a processing queue. This prioritizing of processing system may include allocating processing cores, processing time, memory, a specific memory buffer, or other similar resources to the control packets to prioritize the processing of the control packets. Accordingly, if the packet from host 110 comprised a health check packet, then host 111 may prioritize the packet for processing, such as by placing the control packet in a control packet queue, to ensure that the health check packet is processed with minimal delay. This may prevent unnecessary failovers caused when the packet fails to be processed during a defined time period.

While demonstrated in the example of FIG. 3 as applying the packet prioritization to received ingress packets by host 111, it should be understood that similar operations may also be applied to egress packets being transferred from a network interface. In particular, due to physical limitations, the transmission of a control packet may be delayed when other data packets are to be transferred at or around the same time period. To overcome the deficiency, a host, such as host 110, may identify control packets for fault detection a SDN, and prioritize the transfer of the control packets over the network interface. Accordingly, when a large amount of data traffic is encountered by the host, the host may ensure that control packets are prioritized and processed in a different manner than other data packets, such as data packets from the virtual machines.

Although demonstrated in the example of FIG. 3 as applying to control packets for fault detection in a SDN, it should be understood that similar operations may also be employed to prioritizing or managing the quality of service allocated to control packets in network functions virtualization (NFV). NFV is a network architecture concept that replaces dedicated network appliances (such as routers and firewalls) with software running on standard server or desktop computing systems. Accordingly, when control packets, such as health check packets, are exchanged between physical computers that provide a platform for network appliances, the control packets may be identified and provided a prioritized quality of service to ensure proper processing of the control packet. For example, two virtual computing nodes (virtual machines or containers) acting as routers may exchange health check packets to monitor the operational state of the other virtual node. When these virtual computing nodes operate on separate host computing systems, a health check packet exchanged between the nodes may be prioritized over other data packets received at a physical network interface of the host computing system for the receiving virtual computing node.

Despite being demonstrated in the examples of FIGS. 1-3 as a host with virtual machines executing via a hypervisor, it should be understood that similar operations may be provided by an edge host that provides network connectivity as a distributed router or centralized gateway for services of a software defined network (such as firewall services, VPN services, load balancing services, and the like), wherein the edge host may be connected to the internet, other edge hosts, as well as hosts for virtual machines and containers. In particular, rather than a hypervisor and virtual machines, the edge host may comprise at least one virtual switch and a VTEP to communicate with the other computing systems to provide data and control communications. In some implementations, the edge gateway functions may be implemented as a virtual machine or container on a host computing system and provide the various functions described above, such as load balancing and failover operations, wherein the virtualized gateway function may communicate with gateway functions on other host computing systems.

Figure 4A:
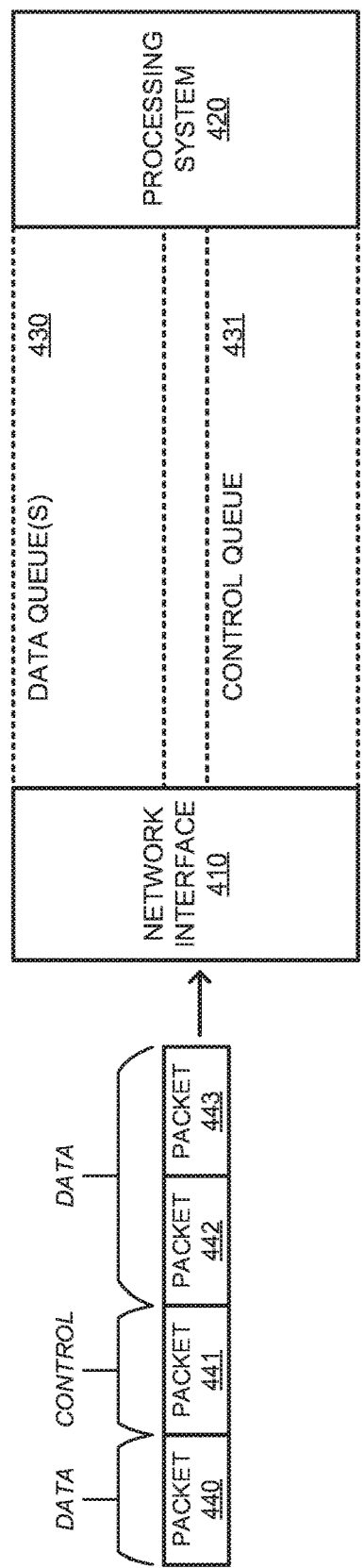
FIG. 4A-4B illustrate an overview of managing received packets according to an implementation.
Figure 4B:
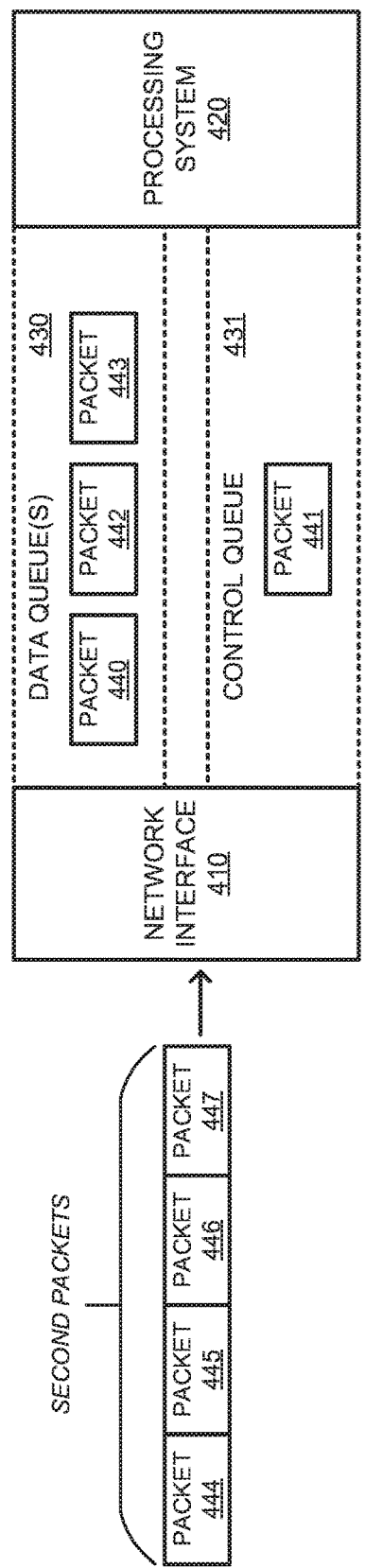

FIGS. 4A-4B illustrate an overview of managing received packets according to an implementation. FIGS. 4A-4B include a network interface 410 and processing system 420 representative of a physical network interface and processing system of a host computing system. FIGS. 4A-4B further includes packets 440-443, which are classified as either data packets or control packets, and further includes data queue(s) 430 and control queue 431.

Referring first to FIG. 4A, host computing systems within a virtual computing environment are often required to exchange data communications for the virtual computing nodes executing thereon. In addition, the hosts may exchange control communications with each other as well as with a manager, a controller, or virtual application nodes (not shown) to configure the SDNs and provide health check monitoring between virtual networking elements within the SDNs. To manage the data packets and control packets as they are received, the physical network interface 410 may be configured, such that the packets are prioritized prior to being provided to main processing system 420. In the present implementation, network interface 410 is configured such that data packets, which provide data communications for the virtual nodes executing via processing system 420, are allocated to data queue(s) 430, whereas received control packets are allocated to control queue 431. Each queue in data queue(s) 430 and control queue 431 may be provided with a different processing resources, such processing clock cycles, cores of processing system 420, a reserved portion in system memory, or some other similar processing resource. In particular, control queue 431 may be provided with a higher quality of service than the processing resource for data queue(s) 430 to ensure timely processing of control packets by processing system 420. Here, data packets 440-443 are to be received by network interface 410, wherein packet 441 is classified as a control packet, and packets 440 and 442-443 are classified as data packets.

Turning to FIG. 4B, as the packets are received, network interface 410 is configured to identify traits within the packets and place the packets within data queue(s) 430 or control queue 431 based on the traits within the packet. In some implementations, in identifying traits within the packets, network interface 410 may provide offsets and/or filters to identify particular packet identification values within the packets. These values may be in the header of the packet in some examples, although it should be understood that the values may be placed anywhere within the data packets. Here, because packets 440 and 442-443 are classified as data packets, the packets are placed within data queue(s) 430 that are used to provide data to the virtual nodes supported by processing system 420. In contrast, because packet 441 is classified as a control packet, the packet is placed within control queue 431 to provide software defined networking control mechanisms for the computing environment.

Once the packets are allocated to the processing queues, processing system 420 may process the packets in accordance with resources allocated to each of the queues. For example, processing system 420 may be configured to process packets in control queue 431 prior to processing packets in data queue(s) 430. In other implementations, processing system 420 may allocate a portion of clock cycles, cores, and the like to processing control queue 431 over data queue(s) 430.

Once the packets are received and placed into the various queues for processing by processing system 420, network interface 410 may be configured to receive second packets 444-447. These packets again may be delivered from one or more other computing systems, including host computing systems in the virtual computing environment, as well as computing systems external to the computing environment (e.g. internet devices). The packets may then be categorized into the requisite queues.

Figure 5:
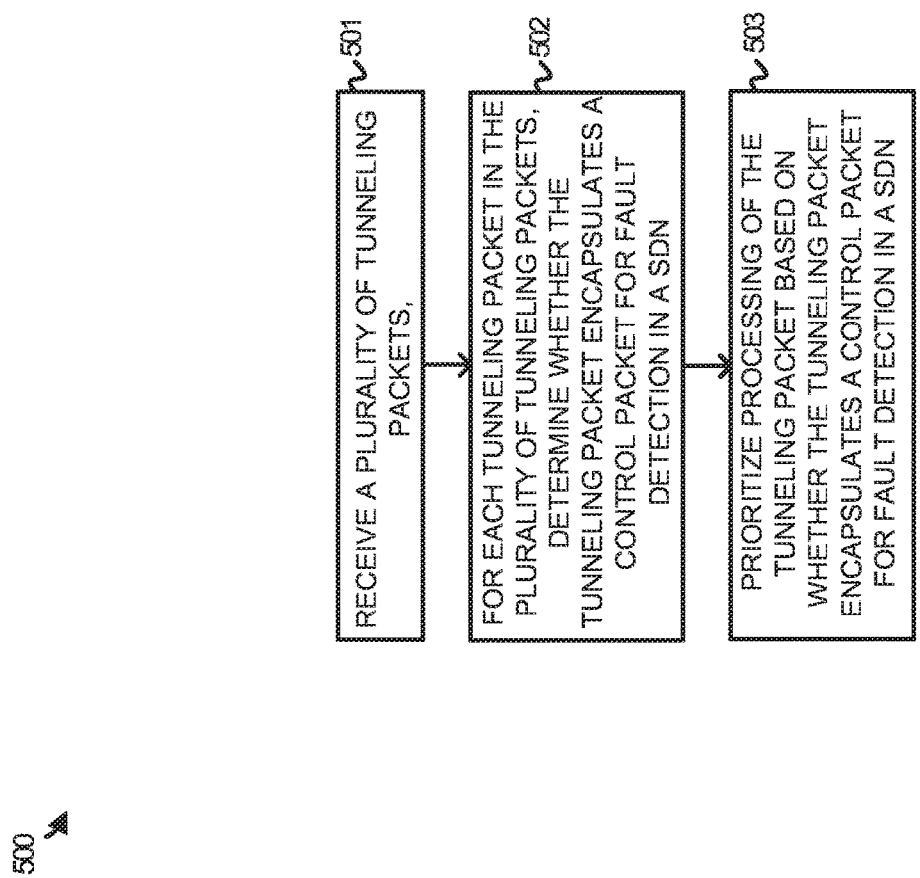
FIG. 5 illustrates an operation of a host computing system to prioritize data packets according to an implementation.

FIG. 5 illustrates an operation 500 of a host computing system to prioritize data packets according to an implementation. The processes of FIG. 5 are described parenthetically in the paragraphs that follow. In particular, the processes of FIG. 5 are described with reference to a physical network interface of the host computing system As depicted in FIG. 5, the network interface of the host computing system receives (501) a plurality of tunneling packets. These tunneling packets may comprise an outer encapsulation header and an inner packet from a gateway node operating on a first host to a gateway node operating on a second host, wherein the inner packets may include data packets for virtual nodes, as well fault detection packets for the gateway nodes. For example, the encapsulated data packets may comprise Virtual Extensible Local Area Network (VXLAN), a Generic Network Virtualization Encapsulation (GENEVE) packet, or some other similar packet that are used to communicate between gateway nodes on separate computing systems.

To ensure that the control packets are properly identified within the encapsulated packets, operation 500 directs the network interface to, for each tunneling packet in the plurality of tunneling packets, determine (502) whether the tunneling packet encapsulates a control packet for fault detection in a SDN, and further directs the network interface to prioritize (503) processing of the tunneling packet based on whether the tunneling packet encapsulates a control packet for fault detection in a SDN. In some implementations, in determining whether a control packet is encapsulated, a header flag may be used in the header for the encapsulation protocol. In particular, when a BFD or some other fault detection packet is identified that is to be encapsulated, a flag may be set in the encapsulation header, such that the receiving network interface may identify the flag, and prioritize the packet for processing by the processing system.

In other implementations, rather than relying on a flag in the encapsulation header to identify a control packet, some network interfaces may be configurable to identify traits within an inner-header of a communication. In this configuration, a controller for the network interface may configure the network interface to search for attributes (IP addresses, port addresses, and the like) within the inner header of the packet, wherein the controller may determine the attributes based on identifying elements (VTEPs, hypervisors, and the like) that exchange control packets and configure the network interface to search for packets with attributes associated with the elements. When the attributes are identified that correspond to a control packet, then the encapsulation packet may be prioritized for processing by the processing system. In contrast, if the attributes are not identified then the packet may be placed in a second queue that is used for other data packets.

Figure 6A:
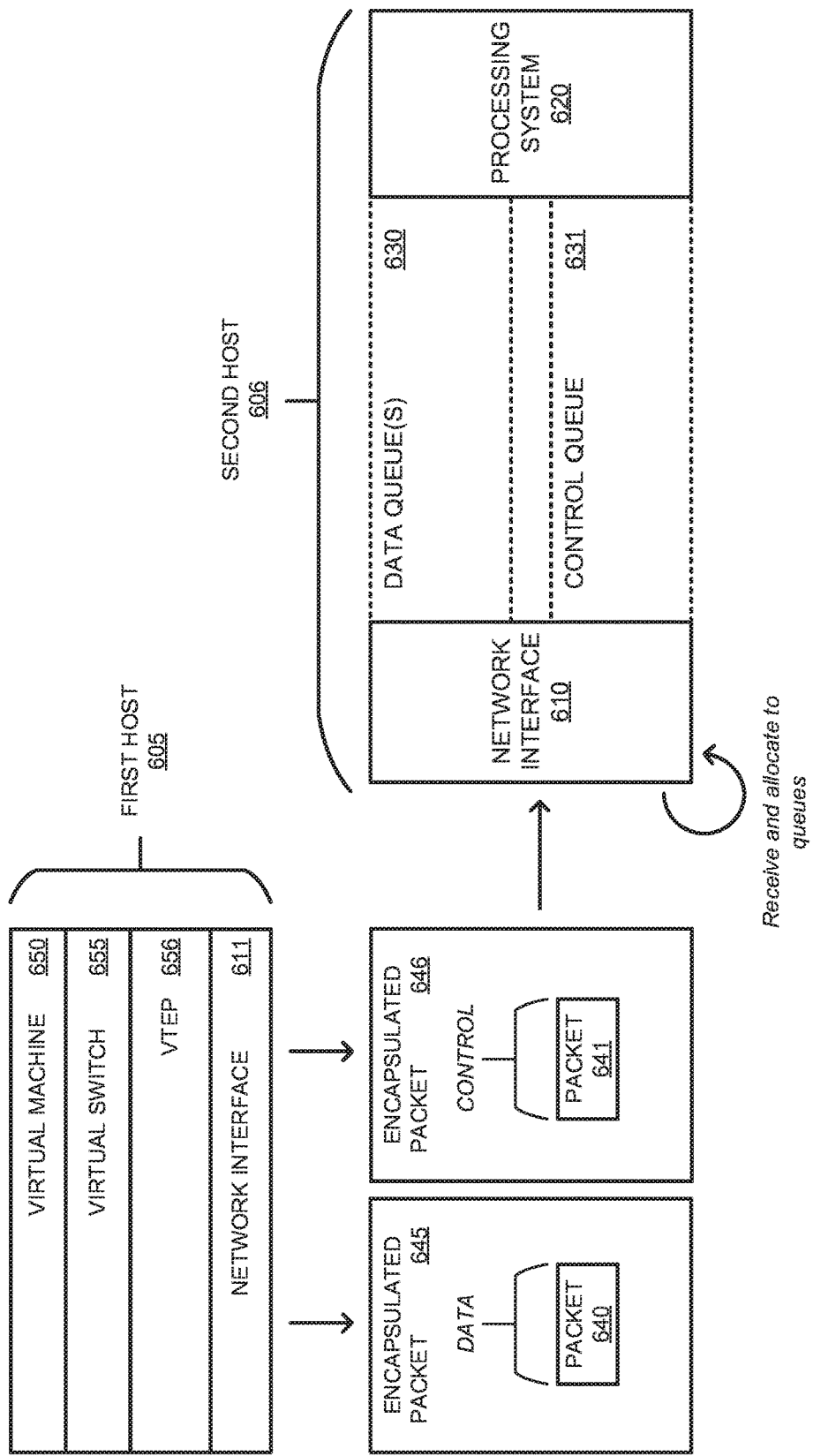
FIG. 6A-6B illustrate an overview of managing encapsulated packets according to an implementation.
Figure 6B:
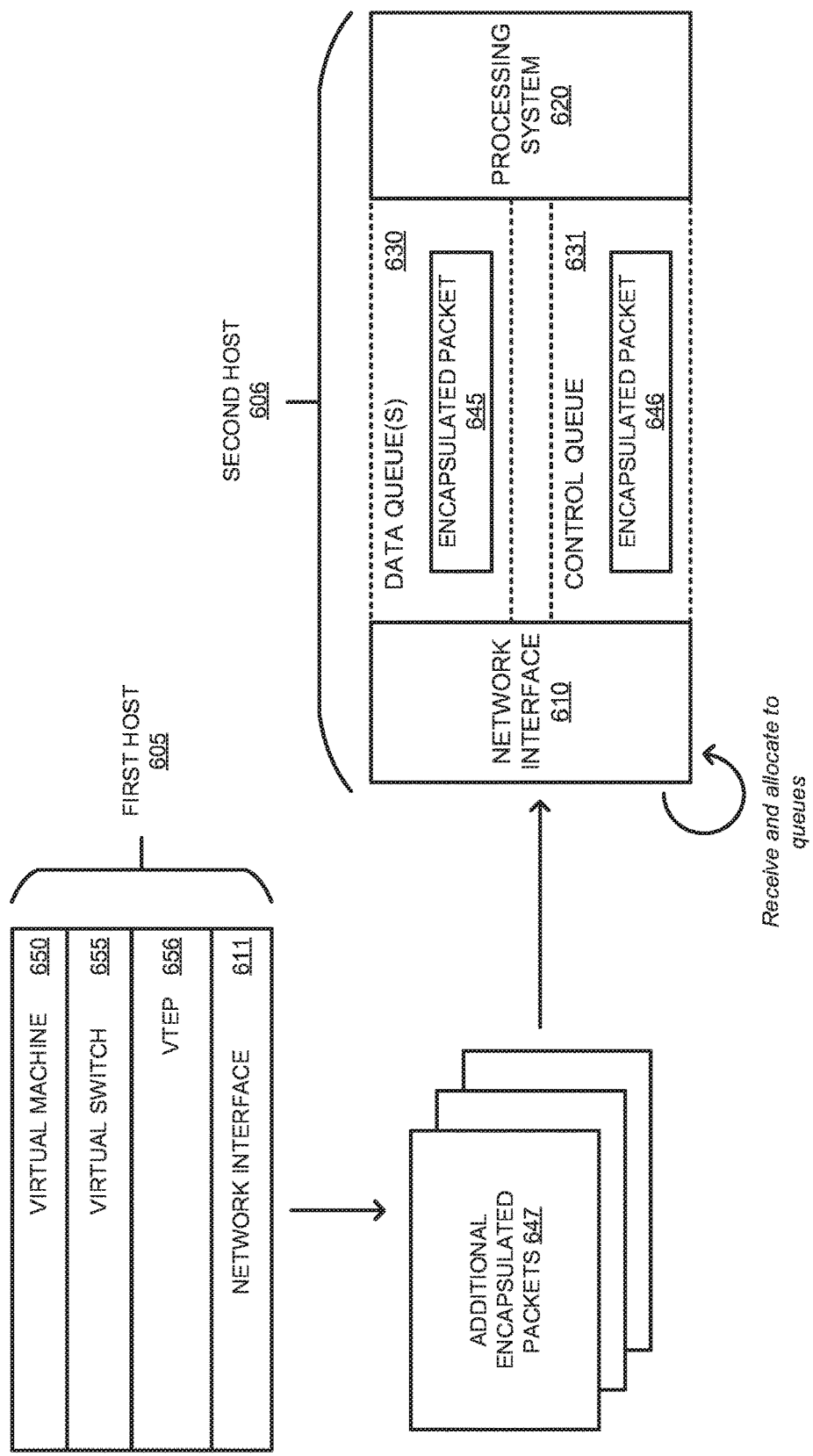

FIGS. 6A and 6B illustrate an overview of managing encapsulated packets according to an implementation. FIGS. 6A and 6B include first host 605 with network interface 611, virtual machine 655, virtual switch 655, and VTEP 656. FIGS. 6A and 6B further include second host 606 with network interface 610, processing system 620, and queues 630-631.

Referring first to FIG. 6A, in operation, VTEP 656 may encapsulate packets that are communicated over or by virtual switch 655, wherein virtual switch 655 provides networking connectivity to virtual machine 650. These packets may include data packets, as well as control packets that are used fault detection between nodes. For example, BFD control packets may be used by virtual switch 655 to monitor whether there is a fault at a second virtual switch or a second gateway within a network. In the present implementation, VTEP 656 generates encapsulated packets 645-646, wherein encapsulated packet 645 includes a data packet 640 and encapsulated packet 646 includes a control packet 641 destined for second host 606. These packets may be encapsulated using VXLAN, GENEVE, or some other similar tunneling protocol.

Turning to FIG. 6B, as the encapsulated packets are received at network interface 610, the packets are then filtered into corresponding queues of queues 630-631. To provide the filtering operation, in some implementations, network interface 610 may monitor for flags within the encapsulation header to identify which of the encapsulated packets contain control packets. For example, when the encapsulated packet is generated at first host 605, the data packet of packets 640-641 may be inspected to determine whether the packet comprises a control packet. This determination may be based on information in the header of packets 640-641, such as source or destination of the packet, a packet type identifier, or some other similar information. Based on the information, the encapsulation header may be updated to identify the type of packet. For example, a bit in the encapsulation header may be set to "1" when the packet is a control packet, or may be set to "0" when the packet is not a control packet.

In other implementations, rather than inspecting the encapsulation header, network interface 610 may inspect the inner header of the encapsulated packets, in this example, the headers of packets 640-641. In inspecting the inner header, network interface 610 may identify source and destination IP addresses for the communication, may identify source and destination port addressing, or other similar attributes for the inner headers corresponding to packets 640-641. Based on the inspection, network interface 610 may place the packets in the corresponding queue of queues 630-631, wherein each of the queues may be allocated different processing resources. In particular, because packet 641 comprises a control packet, encapsulated packet 646 is placed within control queue 631, while encapsulated packet 645 is placed in data queue 630. As the packets are being filtered additional encapsulated packets 647 may be received by network interface 610 and placed in a corresponding queue for processing.

Although not illustrated in the present implementation, to configure network interface 610, a controller may be provided capable of configuring the filters of network interface 610 based on the network topology of the computing environment. To provide the configurations, the controller may manage one or more data structures that store information regarding the various appliances or elements that will exchange control packets. This information may include source and destination IP addressing information, source and destination port information, and the like. Based on the information, filters may be identified for network interface 610 and provided to the interface for implementation, such that network interface 610 can identify fault detection control packets.

While demonstrated in the previous examples as prioritizing BFD, BGP, and other fault detection packets, it should be understood that similar operations may be used on other encapsulated control packets. For example, packets used to configure a virtual switch may be encapsulated, and the network interface may be used to identify the encapsulated control packets for the virtual switch configuration.

Figure 7:
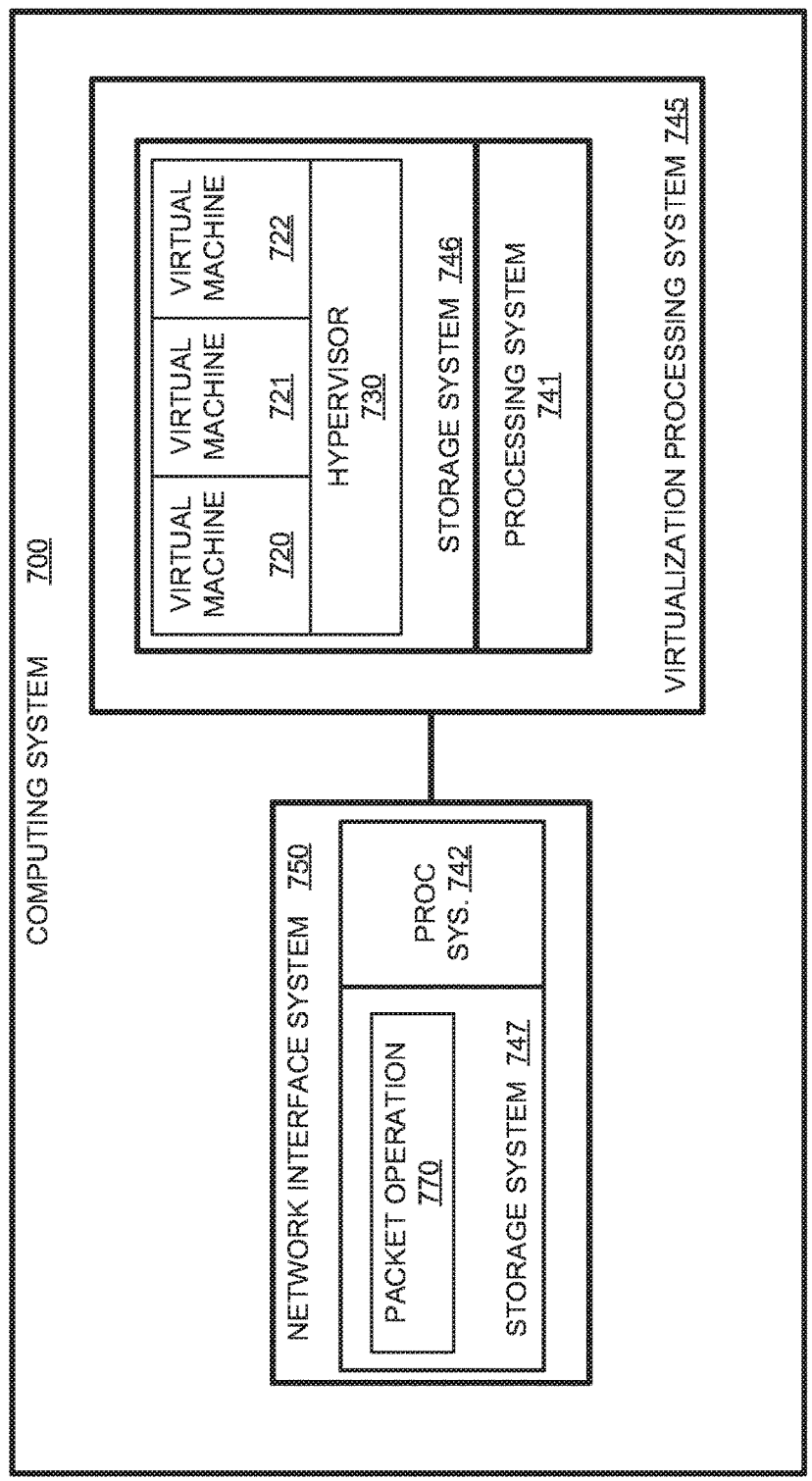
FIG. 7 illustrates a computing system to prioritize processing of network packets according to an implementation.

FIG. 7 illustrates a computing system 700 to prioritize processing of network packets according to an implementation. Computing system 700 is an example of a host computing system described previously in FIGS. 1-6. Computing system 700 includes network interface system 750 which is communicatively coupled to main processing system 745. Network interface system 750 includes storage system 747 and processing system 742, which is used to perform packet operation 770. Main processing system 745 includes storage system 746 and processing system 741, which is used execute virtual machines 720-722 and hypervisor 730. While demonstrated in the example of FIG. 7 with virtual machines, it should be understood that one or more containers may be used in association with packet operation 770.

In operation, network interface system 750 comprises components that communicate over communication links, such as network cards, ports, radio frequency (RF), processing circuitry and software, or some other communication devices. Network interface system 750 may be configured to communicate over metallic, wireless, or optical links. Network interface system 750 may be configured to use Time Division Multiplex (TDM), Internet Protocol (IP), Ethernet, optical networking, wireless protocols, communication signaling, or some other communication format—including combinations thereof. In some implementations, network interface system 750 may be configured to communicate with one or more other physical computing systems using both data and control packets. These systems may include other virtualization host computing systems, edge host computing systems, internet computing systems, and the like.

Processing systems 741-742 comprise microprocessor and other circuitry that retrieves and executes operating software from storage systems 746-747, respectively. Storage systems 746-747 may each include volatile and non-volatile, removable and non-removable media implemented in any method or technology for storage of information, such as computer readable instructions, data structures, program modules, or other data. Storage systems 746-747 may each be implemented as a single storage device, but may also be implemented across multiple storage devices or sub-systems. Storage systems 746-747 may each comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal. While demonstrated in the example of FIG. 7 with multiple storage systems 746-747, it should be understood that the storage systems may be shared in some implementations.

Processing systems 741-742 are typically mounted on a circuit board that may also hold the storage systems. The operating software of storage systems 746-747 comprise computer programs, firmware, or some other form of machine-readable program instructions. The operating software of storage system 747 comprises packet operation 770, while the operating software for storage system 746 includes hypervisor 730 to provide a platform for virtual machines 720-722. The operating software on each storage system of storage systems 746-747 may further include an operating system, utilities, drivers, network interfaces, applications, or some other type of software. When read and executed by processing systems 741-742 the operating software on storage systems 746-747 direct computing system 700 to operate as described herein.

In particular, processing system 741 may read and execute hypervisor 730 to provide a platform for virtual machines 720-722. Hypervisor 730 may be responsible for providing virtual computing elements to the virtual machines including processing resources, storage resources, and network resources. In addition to providing the computing elements, hypervisor 730 may further be used to provide software defined networking, such as one or more virtual switches to the virtual machines executing on computing system 700. This software defined networking may include transferring and receiving packets between virtual machines executing locally via computing system 700, and may further include outgoing and incoming communications for computing systems and virtual nodes external to computing system 700.

In addition to the operations provided by processing system 741, network interface system 750 and processing system 742 may read and execute packet operation 770 from storage system 747. Packet operation 770 may direct processing system 742 to receive a plurality of packets from one or more secondary physical computing systems. As the packets are received, packet operation 770 may direct processing system 742 to, for each packet in the plurality of network packets, identify whether the packet comprises a control packet for fault detection a software defined network. Once a packet is classified, packet operation 770 directs processing system 742 to prioritize each of the packets, for processing by processing system 741, based on whether the packet comprises a control packet. In some implementations, in prioritizing the packets, network interface system 750 may be configured to place the packet in a corresponding processing queue. For example, control packets may be allocated a first queue for processing by processing system 745, while data packets may be placed in a at least one secondary queue for processing by processing system 745. Each of these queues may be allocated processing resources of processing system 745, such as a clock cycle allocation, a processing core allocation, a memory allocation, or some other processing allocation. These processing queues may be used to ensure that control packets are processes in a timely manner by processing system, and are prioritized over the data packets that are communicated to the virtual machines executing on main processing system 745.

Although illustrated in the present example as operating a hypervisor with virtual machines, it should be understood that containers may be executed on main processing system 745 in some examples. In particular, rather than providing the switching via hypervisor, a virtual switch may be executed by main processing system 745. Further, in some implementation, containers and/or virtual machines may be executed within one or more of virtual machines 720-722. These inner containers and/or virtual machines may include inner software defined networking functionality and switches in some implementations. Consequently, in some examples, network interface system 750 may be required to identify control packets for the inner virtual switches.

In some implementations, the packets that are communicated between host computing systems in a computing environment may be encapsulated within tunneling packets for the communications. As a result, in some examples, network interface system 750 may be required to identify an encapsulated packet when it is received, and determine whether a data packet within the encapsulated packet comprises a control packet. To identify the control packets, in some implementations, network interface system 750 may be configured to identify traits of the inner header corresponding to the inner packet, such as source media access control (MAC) addresses, source IP addresses, a header identifier, or some other similar information to identify whether the inner packet comprises a control packet. In other implementations, network interface system 750 may determine whether a flag or other identifier is set in the encapsulation or tunneling header. Thus, rather than requiring network interface system 750 to identify attributes from the inner header of the tunneling packet, network interface system 750 may be capable of identifying attributes in the outer tunneling protocol header.

Despite being illustrated in the example of FIG. 7 as a computing system with virtual machines executing via a hypervisor, it should be understood that similar operations may be provided by an edge host computing system that provides network connectivity as a distributed router or centralized gateway for services of a software defined network (such as firewall services, VPN services, and the like), wherein the edge host may be connected to the internet, other edge hosts, as well as hosts for virtual machines and containers. In particular, rather than a hypervisor and virtual machines, processing system 741 and storage system 746 may be used to execute at least one virtual switch and a VTEP to communicate with the other computing systems.

While not depicted in the example of FIG. 7, it should be understood that a controller module may be implemented via virtualization processing system 745. This controller module may include information about the network topology for systems communicating with computing system 700, and may be capable of configuring network interface system 750, such that control packets may be identified by network interface system 750. In particular, the controller module may identify attributes (such as source and destination networking addresses, source and destination port identifiers, and the like) associated with elements communicating fault detection control packets, and use these attributes to configure network interface system 750, such that the interface system may identify packets with the required attributes.

Although illustrated in the examples of FIGS. 1-7 as prioritizing packets in a SDN environment, it should be understood that similar operations may be used in prioritizing packets for a NFV. In particular, similar to the physical limitations presented by the network interface of a host in a SDN environment, a computing system that provides NFV functionality may be required to exchange control packets with one or more other computing systems. Consequently, as packets are received, the computing system may prioritize the control packets over other data packets, and provide processing resources based on the prioritization. This providing of processing resources may include processing the control packets prior to other data packets, allocating one or more cores of the processing system to the control packets, allocating time slices of the processing system to the control packets, allocating buffer memory to the control packets, or any other similar means of processing the data packets based on the prioritization. Consequently, control packets which are exchanged between virtual nodes (containers and virtual machines) of the NFV may be provided with a higher quality of service than the data packets that are communicated between the nodes of the NFV.

Returning to the elements of FIG. 1, hosts 110-111 may each comprise communication interfaces, network interfaces, processing systems, computer systems, microprocessors, storage systems, storage media, or some other processing devices or software systems, and can be distributed among multiple devices. Hosts 110-111 can each include software such as an operating system, logs, databases, utilities, drivers, natural language processing software, networking software, and other software stored on a computer-readable medium. Hosts 110-111 may each comprise a serving computing system, a desktop computing system, or some other similar computing system.

Communication between hosts 110-111 may use metal, glass, optical, air, space, or some other material as the transport media. Communication between hosts 110-111 may use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication between hosts 110-111 may be a direct link or can include intermediate networks, systems, or devices, and can include a logical network link transported over multiple physical links.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of operating a network interface system on a computing system to manage network traffic, the method comprising:
   receiving a plurality of network packets;
   for each packet in the plurality of network packets, identifying whether the packet comprises a control packet for fault detection in a software defined network (SDN); and
   prioritizing, for processing by a main processing system of the computing system, each packet in the plurality of network packets based on whether the packet comprises a control packet for fault detection in a SDN, wherein the prioritizing comprises:
      in response to identifying that the packet comprises a control packet, placing the packet in a first processing queue for the main processing system of the computing system; and
      in response to identifying that the packet does not comprise a control packet, placing the packet in at least one secondary processing queue for the main processing system.

2. The method of claim 1, wherein identifying whether the packet comprises a control packet for fault detection in a SDN comprises identifying whether the packet comprises a Bidirectional Forwarding Detection packet.

3. The method of claim 1, wherein identifying whether the packet comprises a control packet for fault detection in a SDN comprises identifying whether the packet comprises a Border Gateway Protocol packet.

4. The method of claim 1, wherein the first processing queue is allocated a first set of processing resources for the main processing system, and wherein the at least one secondary processing queue is allocated a second set of processing resources for the main processing system.

5. The method of claim 4, wherein the first set of processing resources comprise a first processing core allocation, a first clock cycle allocation, or a first memory allocation, and wherein the second set of processing resources comprise a second processing core allocation, a second clock cycle allocation, or a second memory allocation.

6. The method of claim 1, wherein the plurality of network packets is encapsulated in a plurality of tunneling packets, and wherein identifying whether the packet comprises a control packet comprises identifying whether the packet comprises a control packet based on an identifier within a header for a corresponding tunneling packet.

7. The method of claim 1, wherein the computing system comprises a first host computing system of a computing environment, and wherein receiving the plurality of network packets comprises receiving the plurality of network packets from at least one second host computing system of the computing environment.

8. A computing apparatus comprising:
   one or more non-transitory computer readable storage media;
   a processing system operatively coupled to the one or more non-transitory computer readable storage media;
   program instructions stored on the one or more non-transitory computer readable storage media to manage network traffic received at a physical network interface for a host computing system that, when read and executed by a processing system of the physical network interface, direct the processing system to at least:
      receive a plurality of network packets;
      for each packet in the plurality of network packets, identify whether the packet comprises a control packet for fault detection in a software defined network (SDN); and
      prioritize, for processing by a main processing system of the host computing system, each packet in the plurality of network packets based on whether the packet comprises a control packet for fault detection in the SDN, wherein the prioritizing comprises:
         in response to identifying that the packet comprises a control packet, place the packet in a first processing queue for the main processing system of the host computing system; and
         in response to identifying that the packet does not comprise a control packet, place the packet in at least one secondary queue for the main processing system.

9. The computing apparatus of claim 8, wherein the program instructions to identify whether the packet comprises a control packet for fault detection in a SDN direct the processing system to identify whether the packet comprises a Bidirectional Forwarding Detection packet.

10. The computing apparatus of claim 8, wherein the program instructions to identify whether the packet comprises a control packet for fault detection in a SDN direct the processing system to identify whether the packet comprises a Border Gateway Protocol packet.

11. The computing apparatus of claim 8, wherein the first processing queue is allocated a first set of processing resources for the main processing system, and wherein the at least one secondary processing queue is allocated a second set of processing resources for the main processing system.

12. The computing apparatus of claim 11, wherein the first set of processing resources comprise a first processing core allocation, a first clock cycle allocation, or a first memory allocation, and wherein the second set of processing resources comprise a second processing core allocation, a second clock cycle allocation, or a second memory allocation.

13. The computing apparatus of claim 8, the plurality of network packets is encapsulated in a plurality of tunneling packets, and wherein identifying whether the packet comprises a control packet comprises identifying whether the packet comprises a control packet based on an identifier within a header for a corresponding tunneling packet.

14. The computing apparatus of claim 8, wherein receiving the plurality of network packets comprises receiving the plurality of network packets from at least one second host computing system.

15. A computing system to manage received network traffic comprising:
   a main processing system configured to execute at least one virtual node; and
   a network interface system communicatively coupled to the main processing system and configured to:
      receive a plurality of network packets;
      for each packet in the plurality of network packets, identify when the packet comprises a control packet for fault detection in a software defined network (SDN); and
      prioritize, for processing by the main processing system, each packet in the plurality of packets based on whether the packet comprises a control packet for fault detection in a SDN, wherein the prioritizing comprises:
         when the packet comprises a control packet, place the packet in a first processing queue of a plurality of processing queues for the main processing system, the first processing queue allocated to process at least control packets for fault detection; and
         when the packet does not comprise a control packet, place the packet in at least one secondary processing queue of the plurality of processing queues.

16. The computing system of claim 15, wherein the at least one virtual node comprises at least one virtual machine or at least one container.

17. The computing system of claim 15, wherein identifying whether the packet comprises a control packet for fault detection in a SDN comprises identifying whether the packet comprises a Bidirectional Forwarding Detection packet or a Border Gateway Protocol packet.

* * * * *